United States Patent
Randazzo

(10) Patent No.: US 6,473,320 B2
(45) Date of Patent: Oct. 29, 2002

(54) VOLTAGE CONVERTER CIRCUIT WITH SELF-OSCILLATING HALF-BRIDGE CONFIGURATION AND WITH PROTECTION AGAINST HARD SWITCHING

(75) Inventor: Vincenzo Randazzo, Biancavilla (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/908,501

(22) Filed: Jul. 17, 2001

(65) Prior Publication Data

US 2002/0044466 A1 Apr. 18, 2002

(30) Foreign Application Priority Data

Jul. 17, 2000 (EP) .............................................. 00830497

(51) Int. Cl.[7] .............................................. H02H 7/122
(52) U.S. Cl. ..................... 363/56.02; 363/132
(58) Field of Search ............... 363/17–19, 55, 363/56.02, 56.01, 56.03, 56.04, 56.11, 56.1, 132

(56) References Cited

U.S. PATENT DOCUMENTS

| 4,507,698 A | * | 3/1985 | Nilssen ........................ 361/42 |
| RE32,953 E | * | 6/1989 | Nilssen ........................ 315/224 |
| 5,303,137 A | * | 4/1994 | Peterson ....................... 363/16 |
| 5,712,776 A | * | 1/1998 | Palara et al. ................... 363/49 |
| 5,717,582 A | | 2/1998 | Duong .......................... 363/95 |
| 5,828,244 A | * | 10/1998 | Palara et al. ................. 327/108 |
| 5,892,673 A | | 4/1999 | Delgado et al. .............. 363/98 |

* cited by examiner

Primary Examiner—Adolf Denske Berhane
(74) Attorney, Agent, or Firm—Lisa K. Jorgenson; Robert Iannucci; Seed IP Law Group PLLC

(57) ABSTRACT

The voltage converter circuit has first and second input terminals, and first and second output nodes, and comprises: a first power switch connected between the first input terminal and the first output node; a second power switch connected between the first output node and the second input terminal; a first delay circuit having first and second terminals connected between the first input terminal and a control terminal of the first power switch; and a second delay circuit having first and second terminals connected between the first output terminal and a control terminal of the second power switch. Each delay circuit detects a variation in the voltage supplied on the respective first terminal and detects an operating condition of the respective power switch on the second terminal, and supplies to the control terminal of the respective power switch a switching on delay signal.

17 Claims, 7 Drawing Sheets

US 6,473,320 B2

VOLTAGE CONVERTER CIRCUIT WITH SELF-OSCILLATING HALF-BRIDGE CONFIGURATION AND WITH PROTECTION AGAINST HARD SWITCHING

TECHNICAL FIELD

The present invention regards a voltage converter circuit with self-oscillating half-bridge configuration and with protection against hard switching.

BACKGROUND OF THE INVENTION

As is known, in all applications requiring conversion of a DC or low frequency AC voltage into an AC voltage having a higher frequency, for example, lighting applications in which the mains voltage with a frequency of 50 Hz is converted into a voltage with a frequency of 30–50 kHz for driving fluorescent or halogen lamps, voltage converter circuits are used generally having a self-oscillating half-bridge configuration.

According to a known solution, a voltage converter circuit 1 having a self-oscillating half-bridge configuration is shown in FIG. 1, and comprises first and second input terminals 2a, 2b (the second input terminal 2b being connected to ground), between which an input voltage $V_{in}$ is supplied, and first and second output nodes 3a, 3b, between which an output voltage $V_{out}$ is supplied. A capacitive divider 4 is connected between the pair of input terminals 2a and 2b and comprises a first capacitor 5, having a capacitance $C_1$, and a second capacitor 6, having a capacitance $C_2$ connected in series.

Between the input terminals 2a, 2b are also connected first and second power switches 7, 8 forming the two branches of the bridge. In particular, the first power switch 7 is connected between the first input terminal 2a and the first output node 3a (also referred to as "middle point"), and the second power switch 8 is connected between the first output node 3a and the second input terminal 2b.

In addition, between the first output node 3a and the second output node 3b is connected a resonant load 10 comprising a lamp 12 connected in parallel to a capacitor 13 and in series to an induction coil 14.

Each of the power switches 7, 8 has a respective control terminal 17, 18 connected to output terminals of an integrated circuit 15 controlling, in phase opposition, the opening or closing of the power switches 7, 8. In particular, when the integrated circuit 15 controls closing of the first power switch 7 and opening of the second power switch 8, the first output node 3a is connected to the first input terminal 2a; instead, when the integrated circuit 15 controls opening of the first power switch 7 and closing of the second power switch 8, the first output node 3a is connected to the second input terminal 2b. In this way, an alternating output voltage $V_{out}$ is obtained at a frequency determined by switching of the switches 7, 8 and is controlled by the integrated circuit 15.

Voltage converter circuits are moreover known using discrete circuits for controlling opening and closing of power switches 7, 8. In particular, FIG. 1b is a schematic representation of a voltage converter circuit 100 comprising first and second oscillating circuits 101, 102, and a transformer 103. The first and second oscillating circuits 101 and 102 and the transformer 103 drive opening or closing of the power switches 7, 8 to generate the oscillations of the voltage supplied to the load. More specifically, the first oscillating circuit 101 is connected in parallel to the first power switch 7 and is triggered by means of a first secondary winding 104. Likewise, the second oscillating circuit 102 is connected in parallel to the second power switch 8 and is triggered by means of a second secondary winding 105. The secondary windings 104, 105 are connected to the transformer 103. A DIAC device 106 is connected to the second power switch 8 and is used to initiate the voltage converter circuit 100.

FIG. 1c shows another known voltage converter circuit, designated by 200 and comprising an oscillating circuit 201 and a driving block 203 for controlling opening or closing of the power switches 7, 8. The oscillating circuit 201 is connected to the first power switch 7 and is triggered by means of a secondary winding 202, whilst the driving block 203 is directly connected to the second input terminal 2b and to the second switch 8, and is connected to the first power switch 7 by means of a level shifter 204. A DIAC device 206 is connected to the second power switch 8 and is used to initiate the voltage converter circuit 200.

FIG. 1d shows a further known voltage converter circuit, designated by 300 and comprising a first driving circuit 301 connected to the first power switch 7 and a second driving circuit 302 connected to the second power switch 8. Both driving circuits 301, 302 are triggered by means of a respective secondary winding 303, 304. The secondary windings 303, 304 are connected to a saturable core transformer 305, which in turn is connected to a resonant load 306 by means of a winding 307. Also in this case, to initiate the voltage converter circuit 300 a DIAC device 308 connected to the second power switch 8 is used.

In order to operate correctly, the known solutions described above must meet the following two conditions:

they must not have the power switches switched on simultaneously; namely, they must have a zero voltage condition across the power switches at the moment in which they switch on (zero voltage switching condition). In this way, the switches are prevented from dissipating a high power when they switch on ("hard switching").

In particular, the latter condition is satisfied by appropriately delaying switching on of the power switches. In this connection, switching off of the second power switch 8 generates a positive variation in the value of the voltage present on the output node 3a. This voltage, after a rise time $T_r$, depending on the value of the current flowing in the induction coil 14 and on the equivalent capacitance present on the output node 3a, assumes the value of the voltage present on the first input terminal 2a. Consequently, to satisfy the zero voltage switching condition, it is necessary to delay switching on of the first power switch 7 by a time at least equal to the rise time $T_r$. In a similar way, switching off of the first power switch 7 generates a negative variation in the value of the voltage present on the output node 3a. The latter voltage, after a fall time $T_f$, depending on the value of the current flowing in the induction coil 14 and on the value of the equivalent capacitance present on the output node 3a, assumes the value of the voltage present on the second input terminal 2b. Also in this case, then, to satisfy the zero voltage switching condition it is necessary to delay switching on of the second power switch 8 by a time at least equal to the fall time $T_f$.

In the voltage converter circuit of FIG. 1a, the delay is obtained by inserting a timing circuit inside the integrated circuit 15 (plus a few components outside the integrated circuit), whereas in the voltage converter circuits of FIGS.

1b, 1c and 1d, the delay is normally obtained by means of an RC type network.

These known solutions present, however, the drawback of generating a fixed delay which is independent of the plot of the voltage present on the output node 3a. This means that if there is a change in the values of the capacitances $C_1$ and $C_2$, upon which the value of the equivalent capacitance present on the output node 3a depends, and/or there is a change in the value of the inductance associated to the induction coil 14, the zero voltage switching condition might no longer be respected.

SUMMARY OF THE INVENTION

According to an embodiment of the present invention, a voltage converter circuit is provided, which overcomes the limitations and drawbacks referred to above.

The voltage converter circuit has first and second input terminals; and first and second output nodes; a first power switch connected between the first input terminal and the first output node; a second power switch connected between the first output node and the second input terminal; a first delay circuit having first and second terminals connected between the first input terminal and a control terminal of the first power switch; and a second delay circuit having first and second terminals connected between the first output terminal and a control terminal of the second power switch. Each delay circuit detects a variation in the voltage supplied on the respective first terminal and detects an operating condition of the respective power switch on the second terminal, and supplies to the control terminal of the respective power switch a switching on delay signal.

A method of operation of the voltage converter circuit is also provided, according to an embodiment of the invention. The method includes delaying the closing of the first power switch in the event that the voltage at the first output node is not constant, or in the event that the second power switch is closed. The method also includes delaying the closing of the second power switch in the event that the voltage at the first output node is not constant, or in the event that the first power switch is closed.

BRIEF DESCRIPTION OF THE DRAWINGS

The characteristics and advantages of the voltage converter circuit according to the invention will emerge from the ensuing description of an example of embodiment, which is provided to furnish a non-limiting illustration, with reference to the attached drawings, in which.

DETAILED DESCRIPTION OF THE INVENTION

Figure 1A:
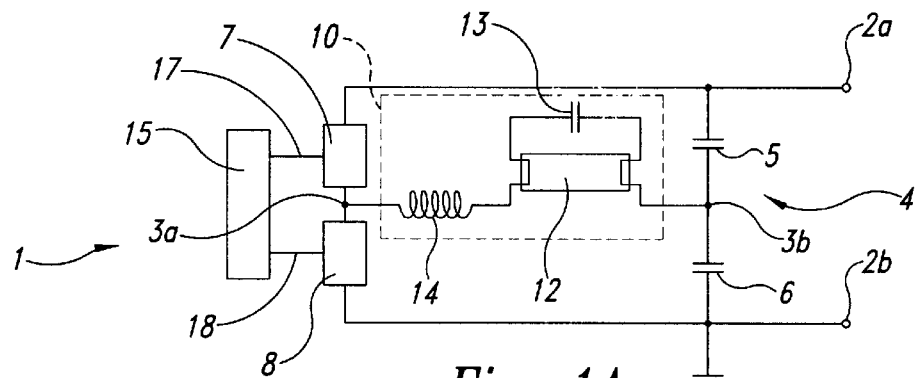
FIGS. 1a, 1b, 1c and 1d show simplified electrical diagrams of known voltage converter circuits.
Figure 1B:
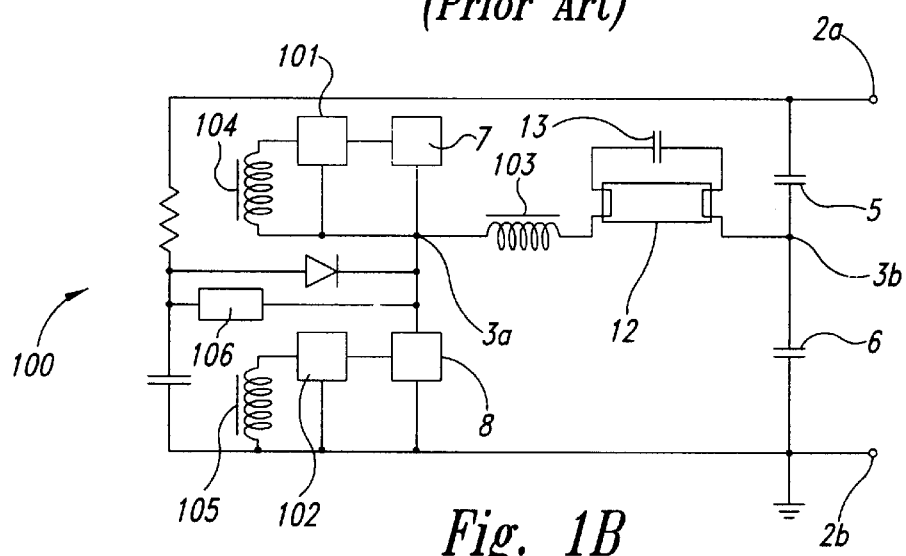
Figure 1C:
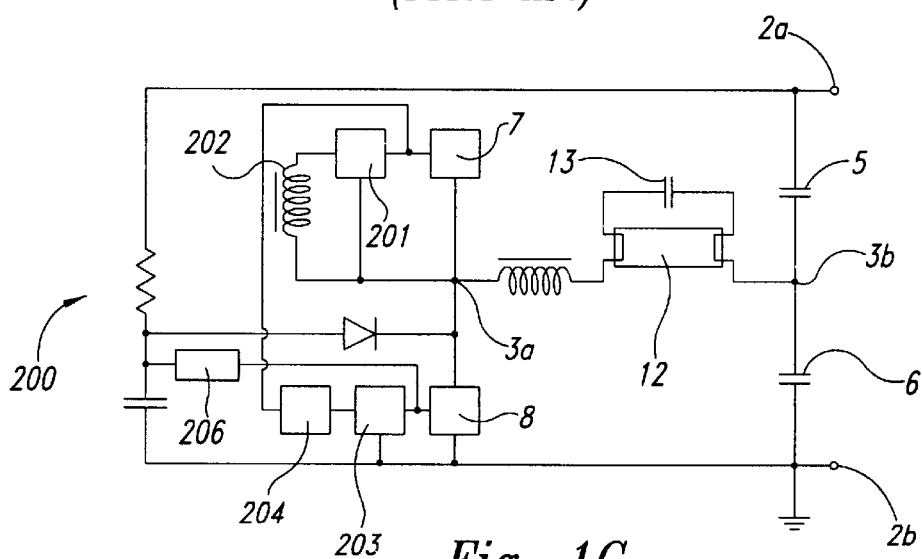
Figure 1D:
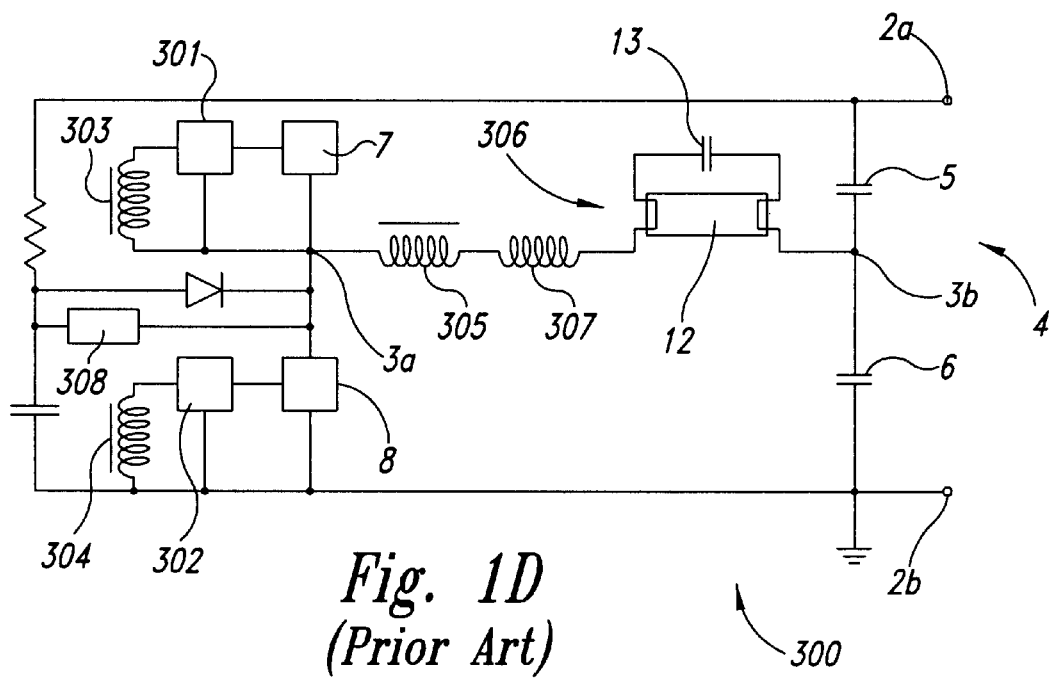
Figure 2:
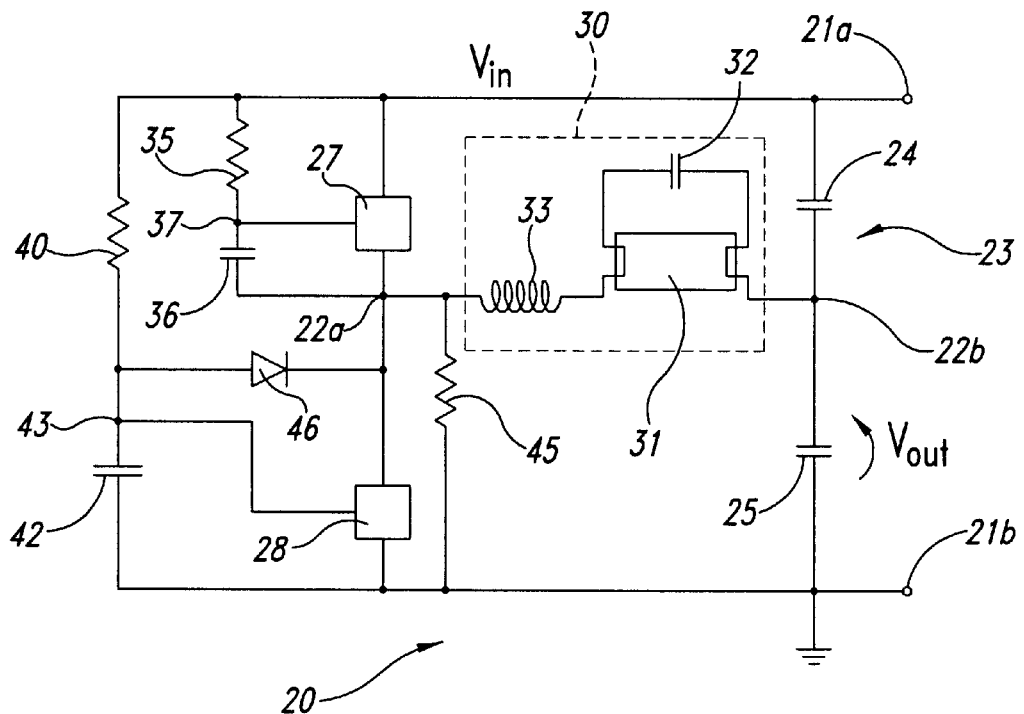
FIG. 2 shows a simplified electrical diagram of a voltage converter circuit according to the present invention.

FIG. 2 shows a voltage converter circuit 20 having a self-oscillating half-bridge configuration, presenting first and second input terminals 21a, 21b, between which an input voltage $V_{in}$ is applied, and first and second output nodes 22a, 22b, between which an output voltage $V_{out}$ is present.

The input voltage $V_{in}$ is a DC or low frequency AC voltage generated by a rectified network not illustrated in FIG. 2.

A capacitive divider 23 is connected between the first input terminal 21a and the second input terminal 21b, and is formed by a first capacitor 24 having a capacitance $C_4$ and a second capacitor 25 having a capacitance $C_3$ of a value equal to that of capacitance $C_4$. The capacitors 24, 25 are connected together in series and are called "snubber capacitors". In particular, the first capacitor 24 is connected between the first input terminal 21a and the second output node 22b, and the second capacitor 25 is connected between the second output node 22b and the second input terminal 21b.

A first resistor 35, having a resistance $R_1$, and a third capacitor 36, having a capacitance $C_1$, are connected in series between the first input terminal 21a and the first output node 22a. In detail, the first resistor 35 is connected between the first input terminal 21a and the first intermediate node 37, and the third capacitor 36 is connected between the first intermediate node 37 and the first output node 22a.

A second resistor 40, having a resistance $R_2$, and a fourth capacitor 42, having a capacitance $C_2$, are connected in series between the first input terminal 21a and the second input terminal 21b. In particular, the second resistor 40 is connected between the first input terminal 21a and a second intermediate node 43, and the fourth capacitor 42 is connected between the second intermediate node 43 and the second input terminal 21b.

The voltage converter circuit 20 also comprises first and second circuit blocks 27, 28. In detail, the first circuit block 27 has a first terminal, a second terminal, and a third terminal respectively connected to the first input terminal 21a, the first output node 22a, and the first intermediate node 37. The second circuit block 28 has a first terminal, a second terminal, and a third terminal respectively connected to the first output node 22a, the second input terminal 21b, and the second intermediate node 43.

Between the first output node 22a and the second output node 22b is connected an electrical load 30 comprising, for example, a lamp 31 connected in parallel to a resonant capacitor 32 having a capacitance $C_R$, and in series to a resonant induction coil 33 having an inductance $L_R$.

A third resistor 45, having a resistance $R_3$, is connected between the first output node 22a and the second input terminal 21b, and a discharge diode 46 is connected between the second intermediate node 43 and the first output node 22a.

Figure 3:
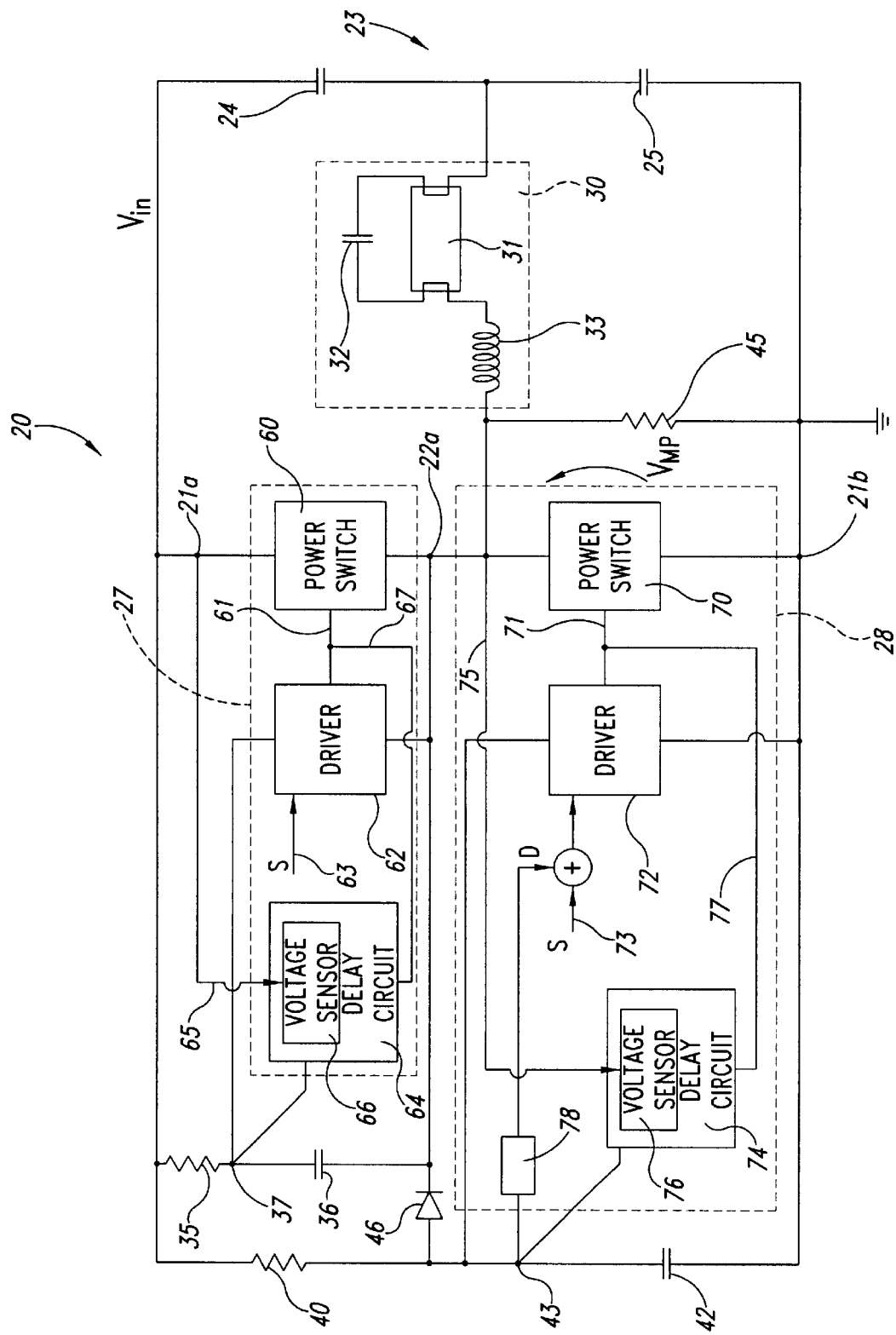
FIG. 3 is a schematic illustration of a portion of the voltage converter circuit of FIG. 2.

As shown in FIG. 3, the first circuit block 27 comprises a first power switch 60 having a first terminal connected to the first input terminal 21a of the voltage converter circuit 20, a second terminal connected to the first output node 22a of the voltage converter circuit, and a control terminal 61.

A first driving circuit (or "driver") 62, which is not shown in detail in FIG. 3 because it is known, is connected between the first intermediate node 37 and the first output node 22a, and has an input terminal 63 receiving a control signal S generated by a control logic unit (not shown), and an output terminal connected to the control terminal 61 of the first power switch 60.

The first circuit block 27 also comprises a delay circuit 64 connected to the first intermediate node 37 and having a first terminal 65 connected to the first input terminal 21a of the voltage converter circuit 20, and a second terminal 67 connected to the control terminal 61 of the first power switch 60. In particular, the first delay circuit 64 comprises a first voltage sensor 66 connected to the terminal 65.

Again with reference to FIG. 3, the second circuit block 28 comprises a second power switch 70 having a first terminal connected to the first output node 22a of the voltage converter circuit 20, a second terminal connected to the second input terminal 21b of the voltage converter circuit, and a control terminal 71.

A second driver 72, not shown in FIG. 3 in so far as it is known, is connected between the second intermediate node 43 and the second input terminal 21b, and has an input terminal 73 receiving the control signal S, and receiving a control signal D generated by a DIAC device 78 connected to the second intermediate node 43. The driver 72 moreover comprises an output terminal connected to the control terminal 71 of the second power switch 70.

The second circuit block 28 also comprises a second delay circuit 74 connected to the second intermediate node 43 and having a first terminal 75 connected to the first output node 22a, and a second terminal 77 connected to the control terminal 71. The second delay circuit 74 comprises a second voltage sensor 76 connected to the input terminal 75.

Figure 4A:
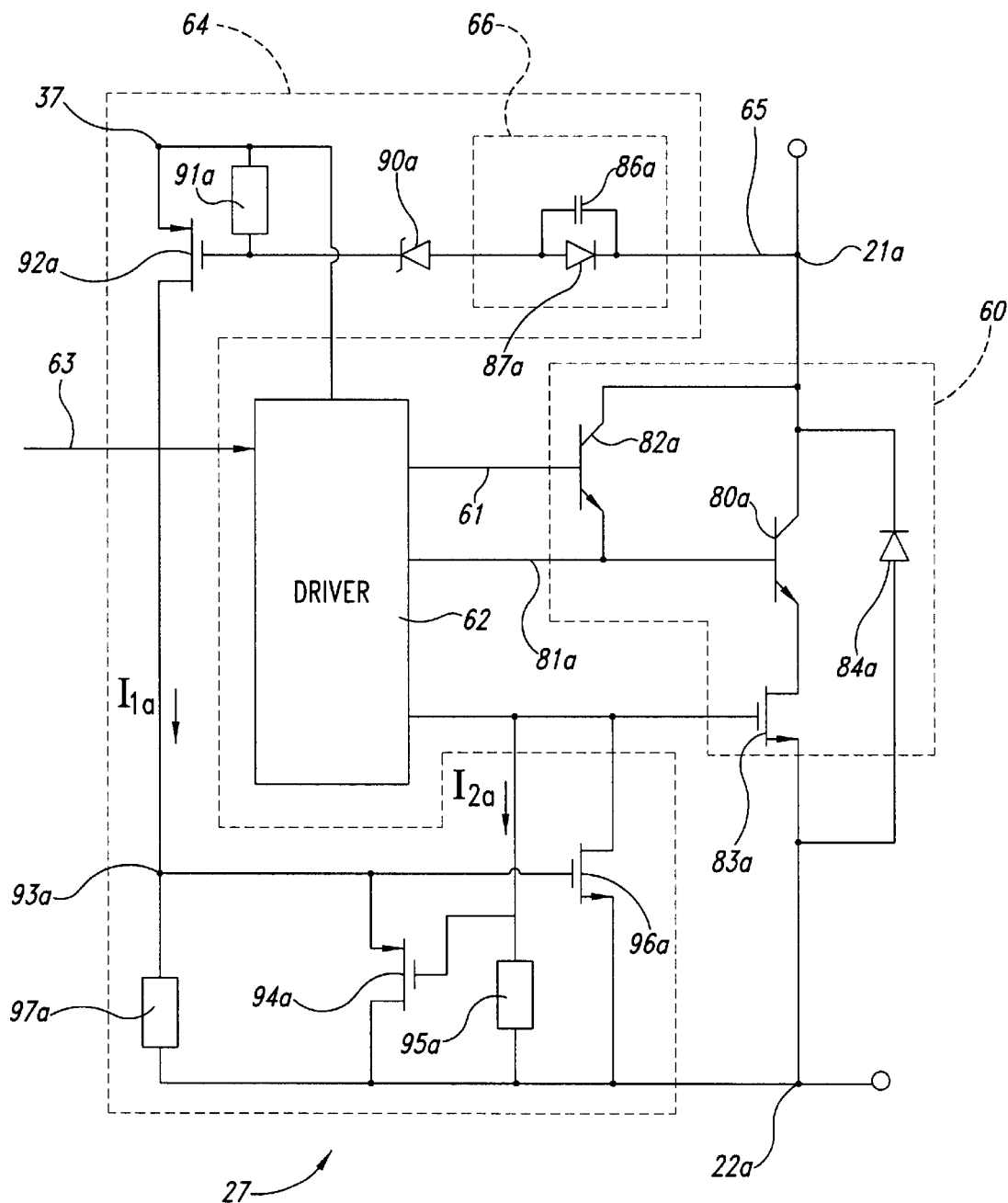
FIGS. 4a and 4b illustrate the portion of FIG. 3 in greater detail.

FIG. 4a is a detailed illustration of a preferred embodiment of the circuit block 27, in which the first power switch 60 is a Darlington configuration Emitter Switch and comprises: a first power transistor 80a, of the NPN type, having a first conduction terminal connected to the first input terminal 21a of the voltage converter circuit 20, a second conduction terminal, and a control terminal 81a connected to the first driver 62; a second power transistor 82a, which is also of the NPN type, having first and second conduction terminals respectively connected to the first input terminal 21a and to the control terminal of the first power transistor 80a, and a control terminal connected to the first driver 62; a third power transistor 83a, of the NMOS type, having first and second conduction terminals respectively connected to the second conduction terminal of the first power transistor 80a and to the first output node 22a, and a control terminal connected to the first driver 62; and a freewheeling diode 84a connected between the first input terminal 21a and the first output node 22a of the voltage converter circuit 20. Alternatively, the first power switch 60 may comprise the MOS power transistor 83a alone.

Figure 6:
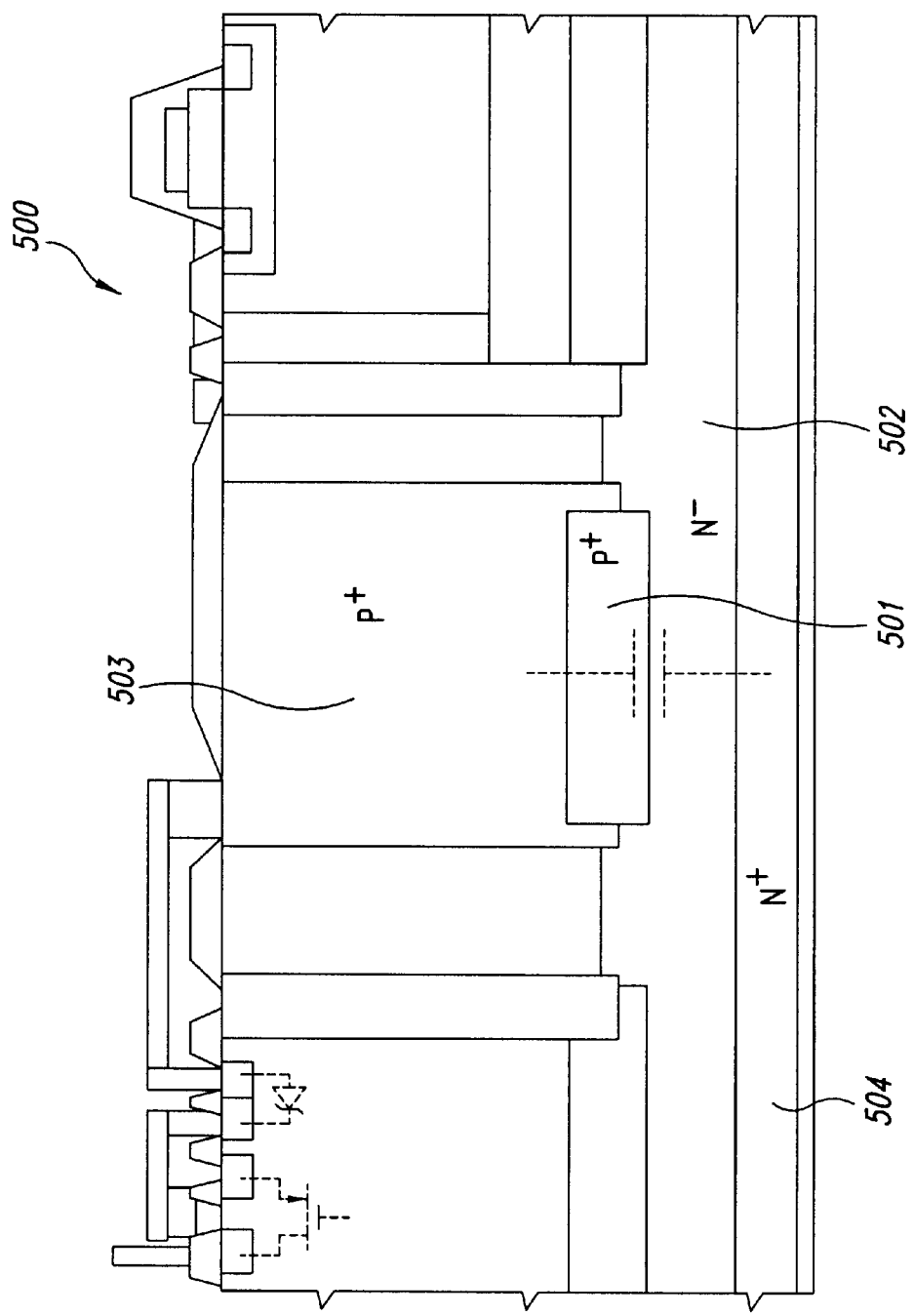
FIG. 6 shows a cross section through a chip incorporating the voltage converter circuit of FIG. 2.

The first voltage sensor 66 is made using VIPOWER™ technology and comprises a high voltage capacitor 86a and a high voltage diode 87a having its cathode connected to the first input terminal 21a. As illustrated in FIG. 6, the high voltage diode 87a is made up of a buried layer 501 of a P$^+$ type and an epitaxial layer 502 of an N$^-$ type, both formed inside a chip 500 made of semiconductor material embedding the voltage converter circuit 20. The high voltage capacitor 86a is a parasitic component formed between an isolation region 503 of a P$^+$ type and a substrate 504 of an N$^+$ type. Alternatively, the first voltage sensor 66 may be formed by a high voltage capacitor of a discrete type.

In addition, the delay circuit 64 comprises a Zener diode 90a (present only if the high voltage capacitor 86a is of the integrated type) having its anode connected to the anode of the high voltage diode 87a and its cathode connected to the first intermediate node 37 by means of a first resistive element 91a. The delay circuit 64 further comprises: a first sensing transistor 92a, of a PMOS type, having first and second conduction terminals respectively connected to the first intermediate node 37 and to a circuit node 93a, and a control terminal connected to the cathode of the Zener diode 90a; a second sensing transistor 94a, of an NMOS type, having a first conduction terminal connected to the first circuit node 93a, a second conduction terminal connected to the first output node 22a and a control terminal connected to the control terminal of the third power transistor 83a and connected to the first output node 22a by means of a second resistive element 95a; and a disabling transistor 96a, of an NMOS type, having a first conduction terminal connected to the control terminal of the third power transistor 83a to generate a switching on delay signal E, a second conduction terminal connected to the first output node 22a, and a control terminal connected to the circuit node 93a. Between the first circuit node 93a and the first output node 22a is connected a third resistive element 97a.

Figure 4B:
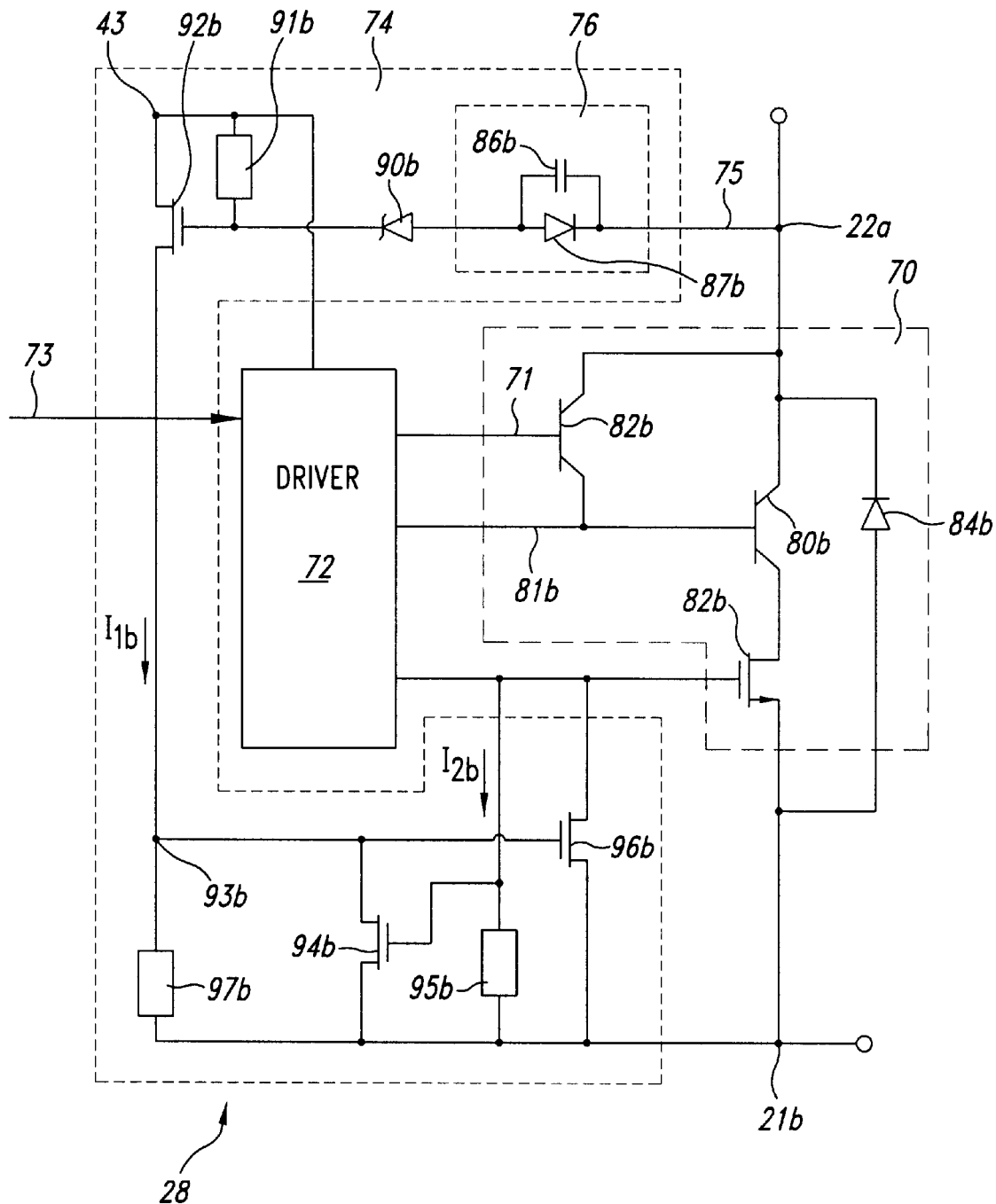

FIG. 4b is a detailed illustration of a preferred embodiment of the circuit block 28, in which the second power switch 70 is a Darlington configuration Emitter Switch and comprises: a first power transistor 80b, of the NPN type, having a first conduction terminal connected to the first output node 22a of the voltage converter circuit 20, a second conduction terminal, and a control terminal 81b connected to the second driver 72; a second power transistor 82b, which is also of the NPN type, having first and second conduction terminals respectively connected to the first output node 22a and to the control terminal of the first power transistor 80b, and a control terminal connected to the first driver 72; a third power transistor 83b, of the NMOS type, having first and second conduction terminals respectively connected to the second conduction terminal of the first power transistor 80b and to the second input terminal 21b, and a control terminal connected to the first driver 72; and a freewheeling diode 84b connected between the first output node 22a and the second input terminal 21b of the voltage converter circuit 20. Alternatively, the first power switch 70 may comprise the MOS power transistor 83b alone.

The second voltage sensor 76 is made in the same way as the first voltage sensor 66 shown in FIG. 6 and comprises a high voltage capacitor 86b and a high voltage diode 87b having its cathode connected to the first output node 22a.

In addition, the delay circuit 74 comprises a Zener diode 90b (present only if the high voltage capacitor 86b is of the integrated type) having its anode connected to the anode of the high voltage diode 87b and its cathode connected to the second intermediate node 43 by means of a first resistive element 91b. The delay circuit 74 moreover comprises: a first sensing transistor 92b, of the PMOS type, having first and second conduction terminals respectively connected to the second intermediate node 43 and to the circuit node 93b, and a control terminal connected to the cathode of the Zener diode 90b; a second sensing transistor 94b, of the NMOS type, having a first conduction terminal connected to the first circuit node 93b, a second conduction terminal connected to the second input terminal 21b, and a control terminal connected to the control terminal of the third power transistor 83b and connected to the input terminal 21b by means of a second resistive element 95b; and a disabling transistor 96b, of the NMOS type, having a first conduction terminal connected to the control terminal of the third power transistor 83b to generate the switching on delay signal E, a second conduction terminal connected to the second input terminal 21b, and a control terminal connected to the circuit node 93b. A third resistive element 97b is connected between the first circuit node 93b and the second input terminal 21b.

With reference to FIGS. 2, 3 and 4, operation of the voltage converter circuit 20 is described in what follows.

Initially, first and second power switches 60, 70 are switched off (i.e., the first power transistors 80a, 80b, the second power transistors 82a, 82b, and the third power transistors 83a, 83b are off), and the input voltage $V_{in}$ (dashed line in FIG. 5) and the voltage $V_{MP}$ present on the first output node 22a (solid line in FIG. 5) are equal to a ground voltage (voltage on the second input terminal 21b). When the input voltage $V_{in}$ (instant to, FIG. 5) is applied between the input terminals 21a, 21b, the first capacitor 24 and the second capacitor 25, having equal capacitances, are charged and send the voltage $V_{MP}$ to a value equal to $V_{in}/2$ (instant $t_i$, FIG. 5).

In addition, through the first resistor 35 and the third resistor 45 there flows a current charging the third capacitor 36 to a voltage $V_{C1}$, whilst through the second resistor 40 there flows a current charging the fourth capacitor 42 to a voltage $V_{C2}$.

The voltages $V_{C1}$ and $V_{C2}$ are, respectively, the supply voltages of the first circuit block 27 and of the second circuit block 28 supplied to the first and second intermediate nodes 37, 43.

In this condition, first and second delay circuits 64, 74 are both off (switching on delay signal E at a high logic level, FIG. 5) since no variation in the voltage $V_{MP}$ is detected and since first and second power switches 60, 70 are off.

In the instant $t_2$ (FIG. 5), the voltage $V_{C2}$ (dashed line in FIG. 5) reaches the triggering value $V_{diac}$ of the DIAC device 78, which generates the control signal D by means of which it enables the second driver 72 to switch on the second power switch 70. In particular, the second driver 72 is enabled to supply appropriate base currents to the control terminals of the first power transistor 80b and to the second power transistor 82b, and to apply an appropriate voltage value to the control terminal of the third power transistor 83b.

Switching on of the second power switch 70 generates a negative variation in the value of the voltage $V_{MP}$ and a consequent positive variation in the value of the voltage $V_{in}-V_{MP}$.

The positive variation in the voltage $V_{in}-V_{MP}$ is detected by the first voltage sensor 66 and converted into a current generating, across the first resistive element 91a, a voltage such as to maintain the first sensing transistor 92a turned off. In these conditions, also the disabling transistor 96a is off and maintains the first delay circuit 64 off.

In turn, the second voltage sensor 76 detects the negative variation in the value of the voltage $V_{MP}$ and converts it into a current generating, across the first resistive element 91b, a voltage such as to cause turning on of the first sensing transistor 92b. Turning on of the first sensing transistor 92b generates a current I1b (FIG. 5) producing, across the third resistive element 97b, a voltage such as to enable turning on of the disabling transistor 96b. In these conditions, however, the disabling transistor 96b cannot turn on. In fact, turning on of the third power transistor 83b generates a current I2b (FIG. 5) producing, across the second resistive element 95b, a voltage such as to cause turning on of the second sensing transistor 94b, which maintains the disabling transistor 96b off, and hence deactivates the second delay circuit 74.

The result is that the second power switch 70 remains switched on, thus enabling correct start-up of the oscillations of the voltage converter circuit 20. In fact, if the second sensing transistor 94b and the second resistive element 95b are not present, as soon as the second driver 74 switches on the second power switch 70, there is a negative variation in the value of the voltage $V_{MP}$, causing turning on of the first sensing transistor 94b and consequently turning on of the disabling transistor 96b, which turns off the second power switch 70. In this condition, once the voltage $V_{MP}$ has gone to zero, the DIAC device 78 again switches on the second power switch 70, and the voltage converter circuit 20 enters a loop which does not allow it to oscillate. The presence of the second sensing transistor 94b and of the second resistive element 95b prevents the voltage converter circuit 20 from entering this loop. Furthermore, it may happen that the current flowing in the induction coil 33 is extinguished before the voltage $V_{MP}$ goes to zero. In this condition, in order to send the voltage $V_{MP}$ to zero, and hence enable the voltage converter circuit 20 to oscillate, it is necessary to switch on the power switch even when a high voltage is present across it. This is made possible thanks to the presence of the second sensing transistors 94a, 94b and to the presence of the second resistive elements 95a, 95b.

Once the negative variation in the value of the voltage $V_{MP}$ (instant $t_3$, FIG. 5) has ceased, since the second delay circuit 74 does not detect any longer a voltage variation on the first output node 22a, it turns off. Between the instants $t_3$ and 4, the standard "ON" phase of the second power switch 70 and the consequent sending to zero of the voltage $V_{MP}$ can take place.

In the instant $t_4$, the control logic unit generates the control signal S enabling the second driver 72 to switch off the second power switch 70. This causes a positive variation in the value of the voltage $V_{MP}$, owing to the fact that current continues to pass to the electrical load 30, and a consequent negative variation in the value of the voltage $V_{in}-V_{MP}$.

The positive variation in the voltage $V_{MP}$ is detected by the second voltage sensor 76 and converted into a current generating, across the first resistive element 91b, a voltage such as to maintain the first sensing transistor 92b off. In these conditions, also the disabling transistor 96b is off and maintains the second delay circuit 74 off.

In turn, the first voltage sensor 66 detects the negative variation in the value of the voltage $V_{in}-V_{MP}$ and converts it into a current generating, across the first resistive element 91a, a voltage such as to cause turning on of the first sensing transistor 92a. Turning on of the first sensing transistor 92a generates a current I1a (not shown in FIG. 5) producing, across the third resistive element 97a, a voltage such as to cause turning on of the disabling transistor 96a, which generates the switching on delay signal E at a low logic level (FIG. 5), so controlling switching off of the first power switch 60. In this case, the second sensing transistor 94a and the second resistive element 95a do not intervene because the third power transistor 83a is off.

The first delay circuit 64 maintains the first power switch 60 off until the negative variation in the voltage $V_{in}-V_{MP}$ ceases (instant $t_5$, FIG. 5), after which it turns off in so far as it no longer detects any variation in this voltage and in so far as the third power transistor 83a is off. In these conditions, the first driver 62 controls switching on of the first power switch 60. Between the instants $t_5$ and $t_6$ the regular "ON" phase of the first power switch 60 takes place and the voltage $V_{MP}$ goes to the value of the input voltage $V_{in}$.

Subsequently, the control logic unit generates another control signal S and enables the first driver 62 to switch off the first power switch 60. This causes a negative variation in the value of the voltage $V_{MP}$ and a consequent positive variation in the value of the voltage $V_{in}-V_{MP}$.

Figure 5:
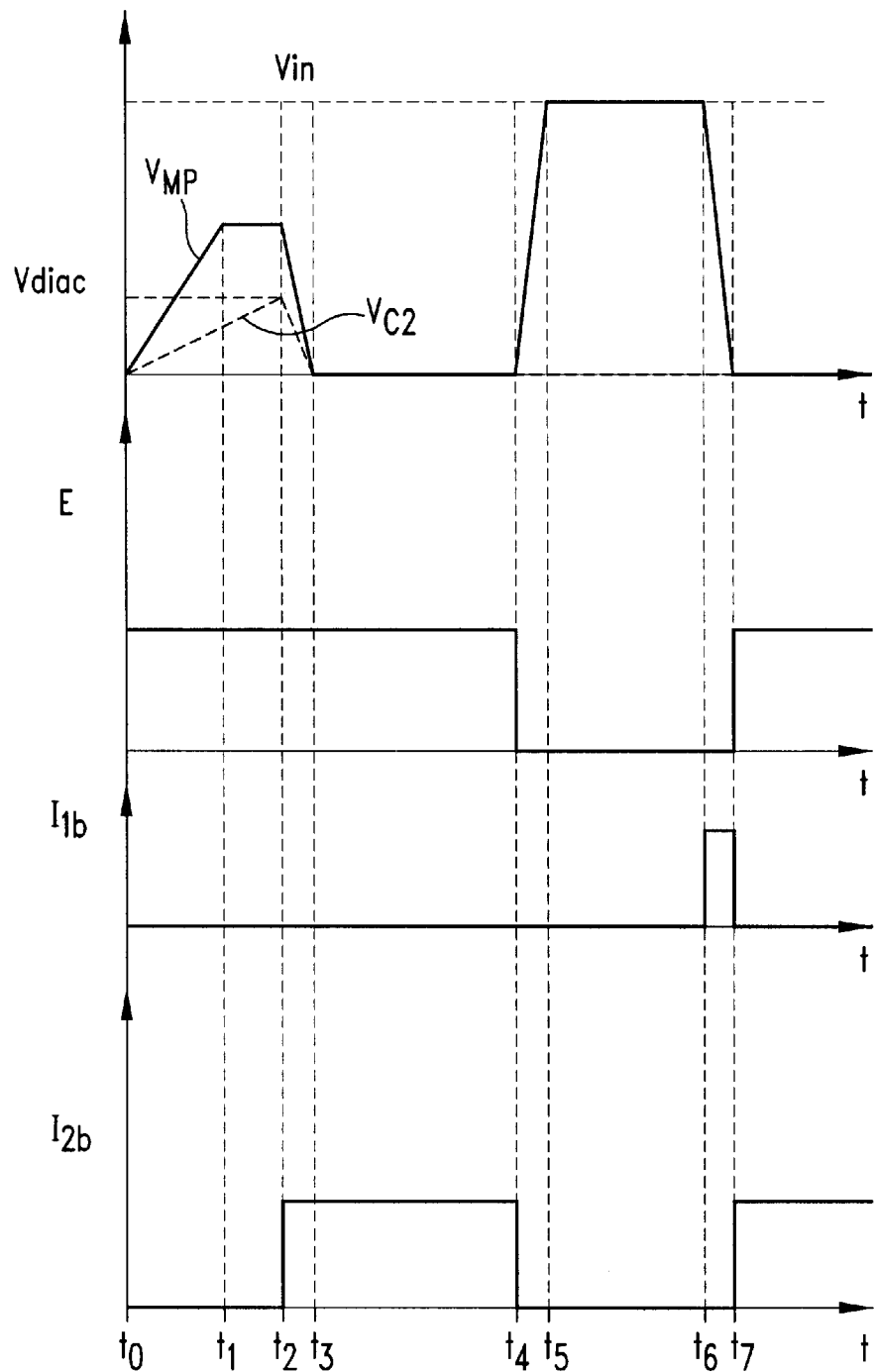
FIG. 5 shows the plots of electrical quantities sampled on the circuit portion of FIG. 3.

Now suppose that the control logic unit generates another control signal S immediately after start of the negative variation in the voltage $V_{MP}$, thus enabling the second driver 72 to switch on the second power switch 70 (instant $t_6$, FIG. 5). In these conditions, the second voltage sensor 76 detects the negative variation in the value of the voltage $V_{MP}$ and converts it into a current generating, across the first resistive element 91b, a voltage such as to cause turning on of the first sensing transistor 92b. Turning on of the first sensing transistor 92b generates a current I1b producing, across the third resistive element 97b, a voltage such as to turn on the disabling transistor 96b, which keeps the second power switch 70 off. Also in this case, the second sensing transistor 94b and the second resistive element 95b do not intervene because the third power transistor 83b is off. The second delay circuit 74 maintains the second power switch 70 off until the negative variation in the voltage $V_{MP}$ ceases, after which it turns off in so far as it no longer detects any variation in this voltage and in so far as the third power transistor 83b is off (instant $t_7$, switching on delay signal E at a high logic level). In these conditions, the second driver 72 controls switching on of the second power switch 70. The "ON" phase of the second power switch 70 takes place regularly, with consequent sending to zero of the voltage $V_{MP}$.

Subsequently, the voltage converter circuit 20 continues to oscillate between the two conditions described above, appropriately delaying switching on of the power switches 60, 70 so as to prevent them from switching on when the voltage across them is still high.

The advantages that may be obtained with the voltage converter circuit 20 are described in what follows. In the first place, the voltage converter circuit according to the invention generates a delay depending exclusively on the pattern of the voltage present on the first output node 22a, guaranteeing switching on of the power switches only after the end of the variations in this voltage. This means that the zero voltage switching condition continues to be respected even though there is a change in the values of the capacitances $C_1$ and $C_2$, on which depends the value of the equivalent capacitance present on the first output node 22a and/or the value of the inductance associated to the load.

In addition, the voltage converter circuit according to the present invention may be used with all the known solutions previously described and for driving any type of load.

Finally, it is clear that numerous variations and modifications may be made to the voltage converter circuit described and illustrated herein, all of which fall within the scope of the inventive idea as defined in the attached claims.

What is claimed is:

1. A voltage converter circuit with a self-oscillating half-bridge configuration and with protection against hard switching, having first and second input terminals between which an input voltage is applied, and first and second output nodes between which an output voltage is present, and comprising:

a first power switch having first and second conduction terminals respectively connected to said first input terminal and to said first output node, and a control terminal;

a second power switch having first and second conduction terminals respectively connected to said first output node and to said second input terminal, and a control terminal;

a first delay circuit having a first terminal connected to said first input terminal, and a second terminal connected to said control terminal of said first power switch, said first delay circuit detecting on said first terminal a variation in one first pre-set direction of a voltage existing between said first input terminal and said first output terminal, and detecting on said second terminal a condition of operation of said first power switch and supplying to said control terminal of said first power switch a switching on delay signal; and a second delay circuit having a first terminal connected to said first output terminal, and a second terminal connected to said control terminal of said second power switch, said second delay circuit detecting on said first terminal a variation in a second pre-set direction of a voltage existing between said first output terminal and said second input terminal, and detecting on said second terminal a condition of operation of said second power switch and supplying to said control terminal of said second power switch said switching on delay signal.

2. A voltage converter circuit according to claim 1, wherein said switching on delay signal has a duration linked to a duration of said variation in a first preset direction and to a duration of said variation in a second preset direction.

3. A voltage converter circuit according to claim 1, wherein said variation in a first preset direction and said variation in a second preset direction comprise a voltage reduction, and said operating condition of said first power switch and said second power switch is a switching off condition.

4. A voltage converter circuit according to claim 1, wherein:

said first delay circuit comprises a first voltage sensor element connected between said first terminal of said first delay circuit and said control terminal of said first power switch; and said second delay circuit comprises a second voltage sensor element connected between said first terminal of said second delay circuit and said control terminal of said second power switch.

5. A voltage converter circuit according to claim 4, wherein said first and second voltage sensor elements each comprise a high voltage capacitor and a high voltage diode connected together in parallel, said high voltage diode being formed by a $P^+$-type buried layer and of an $N^-$-type epitaxial layer embedded in a chip of semiconductor material, and said high voltage capacitor being a parasitic component formed between a $P^+$-type isolation region and an $N^+$-type substrate of said chip.

6. A voltage converter circuit according to claim 4, wherein:

said first delay circuit comprises a first sensing transistor having a first conduction terminal connected to a first supply input, a second conduction terminal connected to a first circuit node, and a control terminal connected to an output terminal of said first voltage sensor element; a second sensing transistor having a first conduction terminal connected to said first circuit node, a second conduction terminal connected to said first output node, and a control terminal connected to said control terminal of said first power switch; and a disabling transistor having a first conduction terminal connected to said control terminal of said first power switch, said first conduction terminal generating said switching on delay signal, a second conduction terminal connected to said output node, and a control terminal connected to said first circuit node; and said second delay circuit comprises a first sensing transistor having a first conduction terminal connected to a second supply input, a second conduction terminal connected to a second circuit node, and a control terminal connected to an output terminal of said second voltage sensor element; a second sensing transistor having a first conduction terminal connected to said second circuit node, a second conduction terminal connected to said second input terminal, and a control terminal connected to said control terminal of said second power switch; and a disabling transistor having a first conduction terminal connected said control terminal of said second power switch, said first conduction terminal generating said switching on delay signal, a second conduction terminal connected to said second input terminal, and a control terminal connected to said second circuit node.

7. A voltage converter circuit according to claim 6, comprising:

a first resistive element connected between said first input terminal and said first supply input;

a second resistive element connected between said first input terminal and said second supply input;

a third capacitive element connected between said first supply input and said first output node; and a fourth capacitive element connected between said second supply input and said second input terminal.

8. A voltage converter circuit according to claim 1, further comprising a capacitive divider connected between said first input terminal and said second input terminal and having an intermediate node connected to said second output terminal.

9. A voltage converter circuit according to claim 1, further comprising:

a first driver connected between said control terminal of said first power switch and said first output node, and having a respective input terminal for receiving control signals; and a second driver connected between said control terminal of said second power switch and said second input terminal, and having a respective input terminal for receiving said control signals and an initialization signal.

10. A switching method in a circuit having a first power switch connected between a first voltage potential and an output node, and a second power switch between the output node and a second voltage potential, comprising:

receiving a switch command from a control logic unit;

observing a voltage level at the output node in response to receiving the switch command;

if the voltage level observed at the output node is constant and the first switch is open, closing the second switch; and if the voltage level observed at the output node is changing or the first switch is closed, delaying the closing of the second switch until the voltage level is constant and the first switch is open.

11. The switching method of claim 10, further comprising;

receiving an additional switch command from the control logic unit;

observing the voltage level at the output node in response to receiving the additional switch command;

if the voltage level observed at the output node is constant and the second switch is open, closing the first switch; and if the voltage level observed at the output node is changing or the second switch is closed, delaying the closing of the first switch until the voltage level is constant and the second switch is open.

12. A device comprising:

a first supply terminal at a first voltage potential;

a second supply terminal at a second voltage potential;

a first power switch connected between the first supply terminal and an output node;

a second power switch connected between the output node and the second supply terminal;

a first voltage sensor circuit configured to detect the presence of a changing voltage potential between the first supply terminal and the output node; and a first delay circuit, configured to delay closure of the first power switch in the presence of a changing voltage potential between the first supply terminal and the output node, as detected by the first voltage sensor circuit.

13. The device of claim 12, further including:

a second voltage sensor circuit configured to detect the presence of a changing voltage potential between the second supply terminal and the output node; and a second delay circuit, configured to delay closure of the second power switch in the presence of a changing voltage potential between the second supply terminal and the output node, as detected by the second voltage sensor circuit.

14. The device of claim 12, wherein the first delay circuit is further configured to delay closing of the first power switch in the event that the second power switch is closed.

15. The device of claim 13, wherein the second delay circuit is further configured to delay closing of the second power switch in the event that the first power switch is closed.

16. The device of claim 12, further including a control logic input terminal configured to receive a control signal to control the operation of the first power switch, subject to the delays of the first delay circuit.

17. The device of claim 13, further including a control logic input terminal configured to receive a control signal to control the operation of the first and second power switches, subject to the delays of the first and second delay circuits.

* * * * *